(12) United States Patent
Wang et al.

(10) Patent No.: US 11,798,534 B2
(45) Date of Patent: Oct. 24, 2023

(54) SYSTEMS AND METHODS FOR A MULTILINGUAL SPEECH RECOGNITION FRAMEWORK

(71) Applicant: salesforce.com, inc., San Francisco, CA (US)

(72) Inventors: Guangsen Wang, Singapore (SG); Chu Hong Hoi, Singapore (SG); Genta Indra Winata, Singapore (SG)

(73) Assignee: salesforce.com, inc., San Francisco, CA (US)

( * ) Notice: Subject to any disclaimer, the term of this patent is extended or adjusted under 35 U.S.C. 154(b) by 336 days.

(21) Appl. No.: 17/162,624

(22) Filed: Jan. 29, 2021

(65) Prior Publication Data

US 2022/0108688 A1 Apr. 7, 2022

Related U.S. Application Data

(60) Provisional application No. 63/086,720, filed on Oct. 2, 2020.

(51) Int. Cl.
| | |
|---|---|
| G10L 15/16 | (2006.01) |
| G10L 15/065 | (2013.01) |
| G06N 3/08 | (2023.01) |
| G06N 3/04 | (2023.01) |
| G10L 15/06 | (2013.01) |

(52) U.S. Cl.
CPC .............. *G10L 15/16* (2013.01); *G06N 3/04* (2013.01); *G06N 3/08* (2013.01); *G10L 15/063* (2013.01); *G10L 15/065* (2013.01)

(58) Field of Classification Search
CPC ...... G10L 15/16; G10L 15/063; G10L 15/065; G06N 3/04; G06N 3/08
See application file for complete search history.

(56) References Cited

U.S. PATENT DOCUMENTS

| | | | |
|---|---|---|---|
| 2019/0189111 A1* | 6/2019 | Watanabe | G10L 15/063 |
| 2020/0027444 A1 | 1/2020 | Prabhavalkar et al. | |
| 2020/0210523 A1* | 7/2020 | Aghajanyan | G06N 3/045 |

OTHER PUBLICATIONS

Schultz et al., "Language-independent and language-adaptive acoustic modeling for speech recognition" Speech Communication 35.1-2 (2001): 31-51. (Year: 2001).*
International Search Report and Written Opinion for PCT/US2021/053098, dated Jan. 25, 2022, 10 pages.

(Continued)

*Primary Examiner* — Bhavesh M Mehta
*Assistant Examiner* — Edward Tracy, Jr.
(74) *Attorney, Agent, or Firm* — HAYNES AND BOONE LLP

(57) ABSTRACT

Embodiments described herein provide an Adapt-and-Adjust (A2) mechanism for multilingual speech recognition model that combines both adaptation and adjustment methods as an integrated end-to-end training to improve the models' generalization and mitigate the long-tailed issue. Specifically, a multilingual language model mBERT is utilized, and converted into an autoregressive transformer decoder. In addition, a cross-attention module is added to the encoder on top of the mBERT's self-attention layer in order to explore the acoustic space in addition to the text space. The joint training of the encoder and mBERT decoder can bridge the semantic gap between the speech and the text.

20 Claims, 11 Drawing Sheets

(56) References Cited

OTHER PUBLICATIONS

Kannan et al., "Large-Scale Multilingual Speech Recognition with a Streaming End-to-End Model", Arxiv.Org, Cornell University Library, 201 Olin Library Cornell University Ithaca, NY 14853,Sep. 11, 2019 (Sep. 11, 2019), 5 pages, XP081481916.
Pratap et al., "Massively Multilingual ASR: 50 Languages, 1 Model, 1 Billion Parameters", Arxiv.Org,Jul. 8, 2020 (Jul. 8, 2020), p. 1-5, XP081717042.
Winata et al., "Adapt-and-Adjust: Overcoming the Long-Tail Problem of Multilingual Speech Recognition", Arxiv.Org, Cornell University Library, 201 Olin Library Cornell University Ithaca, NY 14853,Dec. 3, 2020 (Dec. 3, 2020), 18 pages, XP081828222.

* cited by examiner

Algorithm 1 Adapt-and-Adjust (A2) with Adjust-Train

Require: $\mathcal{D}$: long-tailed multilingual data
Require: $\theta$: an encoder-decoder model
Require: $\alpha, \lambda$: step size hyperparameters 1: randomly initialize $\theta$
2: copy mBERT pretrained language model to decoder parameters in $\theta$
3: compute class priors $\pi$ from $\mathcal{D}$
4: while not done do
5:     Sample batch of multilingual utterances $x \sim \mathcal{D}$
6:     Generate language adapter mask m using the language tag in x
7:     Compute encoder hidden states $h_{enc}$ using x and m by encoder forwarding
8:     Compute logits $f_\psi^{dec}$ using $h_{enc}$ and m by decoder forwarding
9:     Adjust logit according to Equation 9
10:    Compute CTC posteriors $p_{ctc}(y|h_{enc})$
11:    Compute attention loss $\mathcal{L}_{ATTN}$ in Equation
12:    Compute multi-task loss $\mathcal{L}_{MTL}$ using $p_{ctc}(y|h_{enc})$, $\mathcal{L}_{ATTN}$, and $\lambda$ in Equation 2
13:    Update model $\theta \leftarrow \theta - \alpha \nabla_\theta \mathcal{L}_{MTL}$
14: end while

*FIG. 7A*

Table 1: Test results in terms of CER (%) on the CommonVoice dataset.

| Model | high-resource | | | intermediate | | | | | low-resource | | | avg |
|---|---|---|---|---|---|---|---|---|---|---|---|---|
| | en | fr | es | it | ru | zh | tt | nl | tr | ky | sv | |
| Training hours | 877 | 273 | 132 | 66 | 57 | 33 | 20 | 19 | 10 | 9 | 4 | |
| Monolingual (full) | 13.3 | 11.5 | 11.1 | 20.7 | 10.3 | 28.2 | 13.6 | 23.0 | 28.0 | 30.0 | 56.1 | 22.3 |
| Training hours | 80 | 50 | 40 | 20 | 15 | 15 | 15 | 15 | 10 | 9 | 4 | |
| Monolingual | 22.6 | 20.1 | 17.3 | 20.7 | 23.9 | 37.6 | 20.7 | 38.1 | 30.3 | 31.6 | 57.7 | 29.1 |
| SMT | 20.1 | 17.4 | 13.0 | 12.5 | 13.7 | 34.1 | 12.2 | 18.7 | 13.9 | 14.4 | 26.4 | 17.9 |
| BS | 25.2 | 20.3 | 14.5 | 12.7 | 13.2 | 32.6 | 11.5 | 18.0 | 12.9 | 13.4 | 22.8 | 17.9 |
| LAN-Specific Adapters | 24.2 | 19.4 | 13.9 | 12.3 | 11.8 | 32.0 | 10.7 | 16.9 | 11.8 | 12.7 | 21.7 | 17.0 |
| LID | 25.7 | 19.2 | 13.7 | 12.0 | 12.0 | 31.6 | 10.8 | 16.4 | 12.0 | 12.5 | 21.8 | 17.1 |
| LID + Adjust-Train | 24.7 | 18.5 | 13.0 | 11.3 | 11.6 | 31.2 | 10.4 | 16.4 | 11.6 | 12.4 | 22.0 | 16.6 |
| A2 (Adjust-Inference) | 22.6 | 17.9 | 12.7 | 11.2 | 11.2 | 30.1 | 10.2 | 15.8 | 11.4 | 12.2 | 21.1 | 16.0 |
| A2 (Adjust-Train) | 22.0 | 17.7 | 12.5 | 11.3 | 11.1 | 30.4 | 10.0 | 15.9 | 11.3 | 12.1 | 21.3 | 16.0 |

FIG. 8

Table 2: Ablation study on mBERT for multilingual speech recognition.

| | en | fr | es | it | ru | zh | tt | nl | tr | ky | sv | avg |
|---|---|---|---|---|---|---|---|---|---|---|---|---|
| SMT | 20.1 | 17.4 | 13.0 | 12.5 | 13.7 | 34.1 | 12.2 | 18.7 | 13.9 | 14.4 | 26.4 | 17.9 |
| SMT + mBERT | 20.4 | 17.9 | 13.4 | 13.0 | 14.0 | 34.8 | 12.4 | 18.9 | 14.0 | 14.3 | 26.2 | 18.1 |
| BS | 25.2 | 20.3 | 14.5 | 12.7 | 13.2 | 32.6 | 11.5 | 18.0 | 12.9 | 13.4 | 22.8 | 17.9 |
| BS + mBERT | 25.0 | 20.0 | 15.4 | 12.6 | 13.2 | 32.9 | 11.1 | 17.3 | 12.6 | 12.8 | 22.8 | 17.8 |
| BS + Dual-Adapters | 23.5 | 18.9 | 13.5 | 12.1 | 12.3 | 31.0 | 10.9 | 16.5 | 12.0 | 12.9 | 21.6 | 16.8 |
| BS + Dual-Adapters + mBERT | 23.4 | 18.6 | 13.4 | 11.8 | 11.7 | 30.8 | 10.8 | 16.2 | 11.6 | 12.4 | 21.5 | 16.5 |
| SMT + Adjust-Train | 20.2 | 16.9 | 12.5 | 11.9 | 13.1 | 32.9 | 11.3 | 18.5 | 13.5 | 13.9 | 25.3 | 17.3 |
| SMT + Adjust-Train + mBERT | 19.4 | 16.5 | 12.1 | 11.7 | 12.2 | 31.1 | 11.0 | 17.5 | 12.7 | 13.2 | 24.6 | 16.5 |
| A2 with mBERT | 22.0 | 17.7 | 12.5 | 11.3 | 11.1 | 30.4 | 10.0 | 15.8 | 11.3 | 12.1 | 21.3 | 16.0 |
| A2 with XLM-R | 22.1 | 17.6 | 12.5 | 11.4 | 11.4 | 29.6 | 10.3 | 15.9 | 11.5 | 12.1 | 21.4 | 16.0 |

FIG. 9

Table 3: Ablation study on language adapters' impacts on BS + mBERT models

|  | #Params | en | fr | es | it | ru | zh | tt | nl | tr | ky | sv | avg |
|---|---|---|---|---|---|---|---|---|---|---|---|---|---|
| No Adapter | 76M | 25.0 | 20.0 | 15.4 | 12.6 | 13.2 | 32.9 | 11.1 | 17.3 | 12.6 | 12.8 | 22.8 | 17.8 |
| Decoder Adapter Only | 82M | 23.6 | 19.2 | 13.7 | 12.2 | 11.7 | 32.5 | 10.3 | 16.7 | 11.7 | 12.2 | 21.4 | 16.8 |
| Encoder Adapter Only | 78M | 23.1 | 18.5 | 13.3 | 11.8 | 11.7 | 31.1 | 10.6 | 16.0 | 11.5 | 12.6 | 21.3 | 16.5 |
| Encoder + Decoder | 84M | 23.4 | 18.6 | 13.4 | 11.8 | 11.7 | 30.8 | 10.8 | 16.2 | 11.6 | 12.4 | 21.5 | 16.5 |

*FIG. 10*

Table 4: Ablation study of language adapters.

|  | #Params | en | fr | es | it | ru | zh | tt | nl | tr | ky | sv | avg |
|---|---|---|---|---|---|---|---|---|---|---|---|---|---|
| LAN-Specific Adapters | 84M | 24.2 | 19.4 | 13.9 | 12.3 | 11.8 | 32.0 | 10.7 | 16.9 | 11.8 | 12.7 | 21.7 | 17.0 |
| Individual Dual-Adapters | 84M | 23.4 | 18.6 | 13.4 | 11.8 | 11.7 | 30.8 | 10.8 | 16.2 | 11.6 | 12.4 | 21.5 | 16.5 |
| Language Group Dual-Adapters |  |  |  |  |  |  |  |  |  |  |  |  |  |
| By Written Scripts | 78M | 24.0 | 19.4 | 13.9 | 12.1 | 11.7 | 32.1 | 10.5 | 16.3 | 12.0 | 12.0 | 21.0 | 16.8 |
| By Language Families | 78M | 23.5 | 19.0 | 13.6 | 11.9 | 11.4 | 31.0 | 10.4 | 16.2 | 11.6 | 11.9 | 21.4 | 16.5 |

*FIG. 11*

Table 5: Training and inference phase logit adjustments with different A2 models.

|  | Params | en | fr | es | it | ru | zh | tt | nl | tr | ky | sv | avg |
|---|---|---|---|---|---|---|---|---|---|---|---|---|---|
| SMT + mBERT + | 76M | 20.4 | 17.9 | 13.9 | 13.0 | 14.0 | 34.1 | 12.4 | 18.9 | 14.0 | 14.3 | 26.2 | 18.1 |
| Adjust-Inference | 76M | 20.1 | 17.2 | 13.4 | 12.2 | 13.2 | 34.0 | 11.5 | 18.3 | 13.4 | 13.2 | 26.1 | 17.6 |
| Adjust-Train | 76M | 19.4 | 16.5 | 12.1 | 11.7 | 12.2 | 31.1 | 11.0 | 17.5 | 12.7 | 13.2 | 24.6 | 16.5 |
| BS + mBERT + | 76M | 25.0 | 20.0 | 15.4 | 12.6 | 13.2 | 32.9 | 11.1 | 17.3 | 12.6 | 12.8 | 22.8 | 17.8 |
| Adjust-Inference | 76M | 24.1 | 19.3 | 13.5 | 12.0 | 12.1 | 32.3 | 10.6 | 16.7 | 12.2 | 12.6 | 22.2 | 17.0 |
| Adjust-Train | 76M | 23.8 | 19.1 | 13.4 | 11.9 | 11.8 | 32.4 | 10.5 | 16.7 | 12.1 | 12.6 | 21.5 | 16.9 |
| BS + mBERT + Dual-Adapters + | 84M | 23.4 | 18.6 | 13.4 | 11.8 | 11.7 | 30.8 | 10.8 | 16.2 | 11.6 | 12.4 | 21.5 | 16.5 |
| Adjust-Inference | 84M | 22.6 | 17.9 | 12.7 | 11.2 | 11.2 | 30.1 | 10.2 | 15.8 | 11.4 | 12.2 | 21.1 | 16.0 |
| Adjust-Train | 84M | 22.0 | 17.7 | 12.5 | 11.3 | 11.1 | 30.4 | 10.0 | 15.9 | 11.3 | 12.1 | 21.3 | 16.0 |

*FIG. 12*

SYSTEMS AND METHODS FOR A MULTILINGUAL SPEECH RECOGNITION FRAMEWORK

CROSS REFERENCE(S)

The present disclosure is a nonprovisional of and claims priority under 35 U.S.C. 119 to U.S. provisional application No. 63/086,720, filed Oct. 2, 2020, which is hereby expressly incorporated by reference herein in its entirety.

TECHNICAL FIELD

The present disclosure relates generally to machine learning models and neural networks, and more specifically, to an end-to-end transformer-based multi-task learning framework for multilingual speech recognition.

BACKGROUND

End-to-end (E2E) speech recognition systems have been applied to address multilingual speech recognition tasks. The E2E systems eliminate the need of language-dependent lexical, phoneme units as well as language models. For E2E-based multilingual systems, a single network can be trained from a pooled dataset with all target languages. Compared to the monolingual systems, the multilingual model allows parameter sharing and knowledge transfer across languages, which has been shown to benefit all languages, specially the low-resource languages. However, in E2E-based multilingual speech recognition training, one challenge is the data imbalance problem, also known as the long-tail data distribution problem. Specifically, for real world multilingual data, a lot more training samples exist for several major dominating languages like English than the low-resource languages, causing the multilingual model to bias towards the dominating languages.

Therefore, there is a need to improve multilingual models with real world unbalanced training data.

BRIEF DESCRIPTION OF THE DRAWINGS

FIG. 8 provides a table of example test results in terms of character error rate (CER) on the training dataset, according to one embodiment described herein.

FIG. 9 provides a table of ablation study results on mBERT illustrating the effectiveness of mBERT, according to one embodiment described herein.

FIG. 10 provides a table of example ablation study results on language adapters, according to one embodiment described herein.

FIG. 11 provides a table of example ablation study results of language adapters showing the effectiveness of the common language adapters, according to one embodiment described herein.

FIG. 12 provides a table of example performance illustrating training and inference phase logit adjustments with different models, according to one embodiment described herein.

Figure 1:
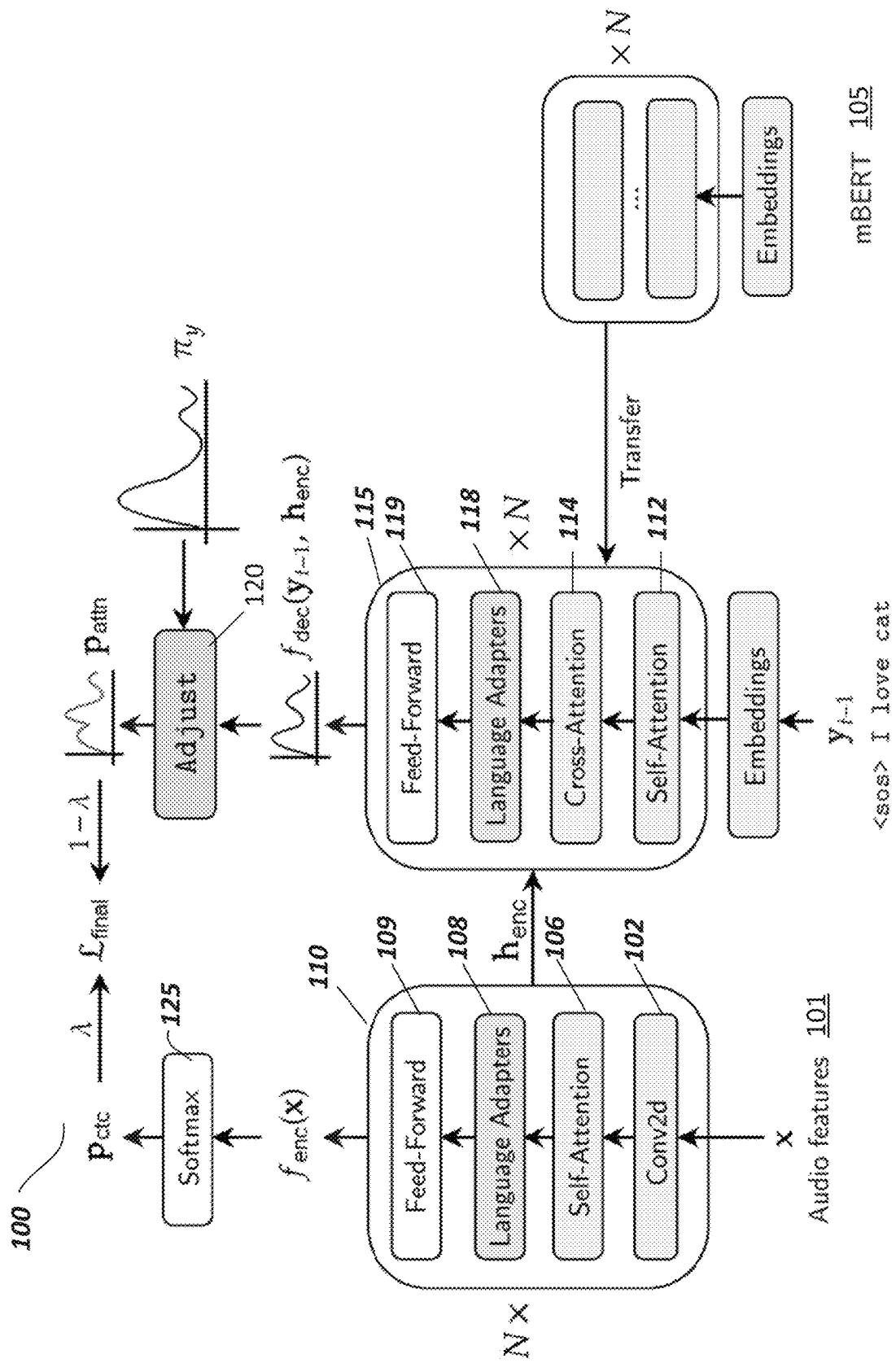
FIG. 1 shows a simplified illustration of the architecture of the adapt-and-adjust framework for end-to-end multilingual speech recognition, according to the embodiments described herein.

In the figures and appendix, elements having the same designations have the same or similar functions.

DETAILED DESCRIPTION

Multilingual Automatic Speech Recognition (ASR) models can often be used to recognize multiple languages. In real-world applications, multilingual ASR models can often encounter a training data imbalance issue, often known as the long-tailed distribution challenge, e.g., that some resource-rich languages like English have abundant training data, while the majority low-resource languages have varying amounts of training data. This imbalanced data setting poses a multitude of open challenges for multi-task training because the distribution of the training data can often be rather skewed. Thus, such imbalanced training dataset may be caused by at least two real-world scenarios: first, very limited audio samples are available for low-resource languages, such as Kyrgyz, Swedish, and Turkish, while simultaneously, vast amounts of data exist from high-resource languages, such as English, French, and Spanish; and second, graphemes or subword labels follow a long-tailed distribution in multilingual ASR since some labels appear significantly more frequently, even for a monolingual setting. Furthermore, a multilingual system may include languages with writing scripts other than the Latin alphabet, such as Chinese or Cyrillic, that further worsen the skewness.

To address the skewed training data distribution issue, one of the major challenges is the class imbalance issue, e.g., the bias of the multilingual model towards the dominant languages. Another challenge is how to model the languages with limited training data robustly. Specifically, the "long-tail problem" can be twofold: 1) the long-tailed class distribution arising from the skewed multilingual data and sentence piece distribution 2) the robust modelling of languages with limited training data, i.e., tail languages.

In view of the long-tail problem in multilingual speech recognition, embodiments described herein employs a speech transformer combined with a language adaptor in both the encoder and the decoder, and logit adjustment following the decoder. The transformer framework, referred to as the Adapt-and-Adjust (A2) framework, combines both adaptation and adjustment methods as an integrated end-toend training to improve the models' generalization and mitigate the long-tailed issue.

Specifically, a distilled mBERT model is converted to an autoregressive transformer decoder to jointly explore the multilingual acoustic and text space to improve the performance of low-resource languages. For example, parameters of a pre-trained mBERT are employed by the transformer decoder. A cross-attention module is added to the encoder on top of the mBERT's self-attention layer in order to explore the acoustic space in addition to the text space. The joint training of the encoder and mBERT decoder can bridge the semantic gap between the speech and the text. In this way, the language generation ability of low-resource languages that do not have enough data for training can be largely improved.

In addition, to adapt the multilingual network to specific languages with minimal additional parameters, a language-specific and a language-agnostic adapter are employed in parallel to augment each encoder and decoder layer. While the language-specific adapter focuses on adapting the shared network weights to a particular language, a language-agnostic (common) adapter is proposed to learn some shared and language-agnostic knowledge for better knowledge transfer across languages.

In one embodiment, to increase the relative margin between logits of rare versus dominant languages, class imbalance adjustments are performed during multilingual model training or inference based on logit adjustment. Specifically, class imbalance adjustment is applied by adjusting the logits of the softmax input with the class priors. This approach balances the relative margin between dominant and rare languages, which can be applied together with the end-to-end learning or during the post-training as a plug-and-play method.

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

A2 Framework Overview

FIG. 1 shows a simplified illustration of the architecture of the A2 framework 100 for end-to-end multilingual ASR, according to the embodiments described herein. Specifically, A2 framework 100 is built on a transformer-based sequence-to-sequence model as the base model. For example, a sequence-to-sequence speech transformer model based on the hybrid connectionist temporal classification (CTC)-attention network is used for acoustic modeling. Such transformer model may be similar to those described in Dong et al., A no-recurrence sequence-to-sequence model for speech recognition, in Proceedings of IEEE International Conference on Acoustics, Speech and Signal Processing (ICASSP), pp. 5884-5888, 2018; Kim et al., Joint ctc-attention based end-to-end speech recognition using multi-task learning, CoRR, abs/1609.06773, 2016; Karita et al., Improving transformer-based end-to-end speech recognition with connectionist temporal classification and language model integration, in Proceedings of Interspeech 2019, pp. 1408-1412, 2019, which are all hereby expressly incorporated by reference herein in their entirety.

The transformer base model includes an encoder 110 and a decoder 115. The encoder 110 receives an input of audio feature sequence $x \in \mathbb{R}^{T \times F}$ and outputs the audio latent representations $y = f_{enc}(x)$, where T and F denote the sequence length and feature dimension.

Figure 2B:
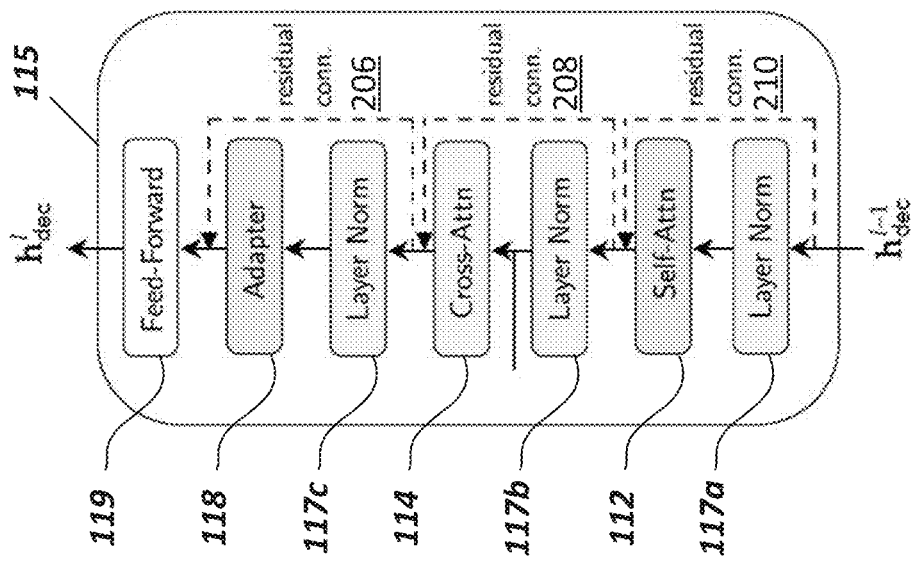
FIG. 2B provides a simplified diagram illustrating the structure of the decoder shown in FIG. 1, according to some embodiments described herein.
Figure 2A:
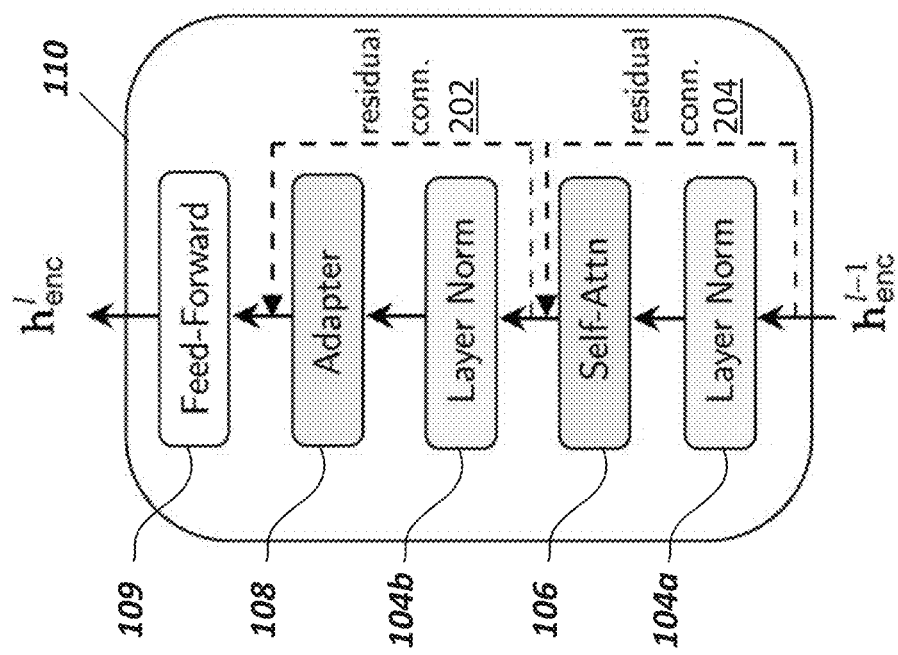
FIG. 2A provides a simplified diagram illustrating the structure of the encoder shown in FIG. 1, according to some embodiments described herein.

The encoder 110 includes a number of encoder layers. Each encoder layer includes a two-dimensional convolution layer 102 followed by a self-attention layer 106. The convolution layer 102 is used to extract more robust features before they are sent to the self-attention layer 106. For example, FIG. 2A provides a simplified diagram illustrating the structure of encoder 110, according to some embodiments described herein. As shown in FIG. 2A, an adapter layer 108 is added after the two layer norm 104a-b (not shown in FIG. 1) and self-attention layer 106. The self-attention layer 106 attends to features of an input. The adapter layer 108 includes a language-specific adapter that adapts a self-attention output into a adapter output capturing language-intrinsic knowledge from self-attended features, and a common adapter that adapts the self-attention output into a adapter output capturing language-agnostic knowledge from the self-attended features, as further described in relation to FIG. 3. A feed-forward sublayer 109 generates an encoded representation of the input (encoder hidden states) based on a combination of the first adapter output and the second adapter output.

Two residual connections 202 and 204 are applied after both the self-attention layer 106 and the adapter layer 108. A feedforward layer 109 outputs the encoder layer output $h_{enc}^{l}$ of the l-th encoder layer:

$$o = \text{SelfAttn}(\text{LayerNorm}(h_{enc}^{l-1})) + h_{enc}^{l-1},$$

$$h_{enc}^{l-1} = \text{FeedForward}(\text{Adapter}(\text{LayerNorm}(o)) + o),$$

where $h_{enc}^{l-1}$ is the encoder hidden states of the previous layer (l-1) and $h_{enc}^{l}$ is the output of the encoder layer l.

Referring back to FIG. 1, the decoder 115 has two attention mechanisms, one for self-attention 112, the other one cross-attention layer 114 for the encoder output. For example, FIG. 2B provides a simplified diagram illustrating the structure of decoder 115, according to some embodiments described herein. As shown in FIG. 2B, the adapter layer 118 is placed after the layer norm 117c, the cross-attention layer 114, layer norm 117b, the self-attention layer 112, and layer norm 117a. The self-attention layer 112 attends to embeddings corresponding to the previous token. The cross-attention layer 114 attends to the encoder hidden states and a normalized self-attention output. The adapter 118 includes a language-specific adapter and a common adapter that adapt a cross-attention output within the decoder layer. The feed-forward sublayer 119 generates the logit output based on a combination of outputs from the second language-specific adapter and the second common adapter.

Thus, the decoder hidden states of layer l is computed as:

$$o_1 = \text{SelfAttn}(\text{LayerNorm}(h_{enc}^{l-1})) + h_{enc}^{l-1},$$

$$o_2 = \text{CrossAttn}(h_{enc}, \text{LayerNorm}(o_1)) + o_1,$$

$$h_{enc}^{l-1} = \text{FeedForward}(\text{Adapter}(\text{LayerNorm}(o_2)) + o_2),$$

where $h_{dec}^{l-1}$ is the decoder hidden states of the previous layer, and $h_{dec}^{l}$ is the output of the current layer.

The decoder 115 adopts beam search to predict the sentence pieces. The decoding score is computed as a weighted sum of both the CTC and attention network probabilities using β as the decoding parameter to balance them:

$$\hat{y} = \underset{y \in Y^*}{\operatorname{argmax}} \{\beta p_{ctc}(y \mid h_{enc}) + (1-\beta) p_{attn}(y \mid h_{enc}, y')\}$$

where y' is the decoded sequence so far.

Referring back to FIG. 1, in one embodiment, a CTC layer, may be added to the encoder output to serve as a regularizer to the attention model. Further details of the CTC layer may be found in Graves et al., Connectionist temporal classification: labelling unsegmented sequence data with recurrent neural networks, in Proceedings of the 23rd international conference on Machine learning, pp. 369-376, 2006, which is hereby expressly incorporated by reference herein in its entirety. Thus, the output of the encoder $f_{enc}(x)$ may be passed to the softmax module 125 to generate CTC output $p_{ctc}$.

At the decoder branch, the decoder output $y_t=f(y_{t-1}, h_{enc})$ is passed to an adjustment module 120. The adjustment module 120 adopts a normalization method to calibrate logits on models trained on long-tail data. For example, in the imbalance data setting, logits generated by the model are highly skewed and give very low scores to rare classes. Therefore, these scores have to be adjusted according to the distribution of the labels' occurrence to give higher penalty when predicting the resource poor classes wrongly. Instead of applying the adjustment to the highest estimated class-probability as some existing system may choose to do, the adjustment module 120 adjusts the logits of all classes. Thus the adjustment process can be applied to generation models, such as sequence-to-sequence, and this approach is task-agnostic. Further details of the logic adjustment module 120 is described below in relation to FIG. 5.

The output of the language adjustment module 120 $p_{attn}$, together with $p_{ctc}$ may then be used to compute the loss objective to jointly train the encoder 110 and the decoder 115.

The framework 100 is trained in an autoregressive manner by predicting the next token given the current output. The encoder 110 and the decoder 115 may be jointly trained by a multi-task loss $\mathcal{L}_{MTL}$, combining a CTC loss computed from the CTC output $p_{ctc}$ and an attention loss $\mathcal{L}_{ATTN}$ computed from the decoder output $p_{attn}$. The multi-task loss $\mathcal{L}_{MTL}$ may be computed as an interpolation of the CTC loss and the attention loss with a hyper-parameter λ (0≤λ≤1):

$$\mathcal{L}_{ATTN} = KL(p_{attn} \| p_y)$$

$$\mathcal{L}_{MTL} = \lambda \log p_{ctc}(y \mid h_{enc}) + (1-\lambda) \mathcal{L}_{attn}$$

where $p_Y$ is the label distribution after label smoothing to prevent the model from making over-confident predictions. Kullback-Leibler divergence loss (KL) is used for the attention loss.

In one embodiment, the transformer decoder 115 may be replaced with a pre-trained mBERT 105 for better language modeling, particularly for low-resource languages. For example, parameters of the pre-trained mBERT may be transferred to the transformer decoder 115, as further described below in relation to FIG. 3.

Figure 3:
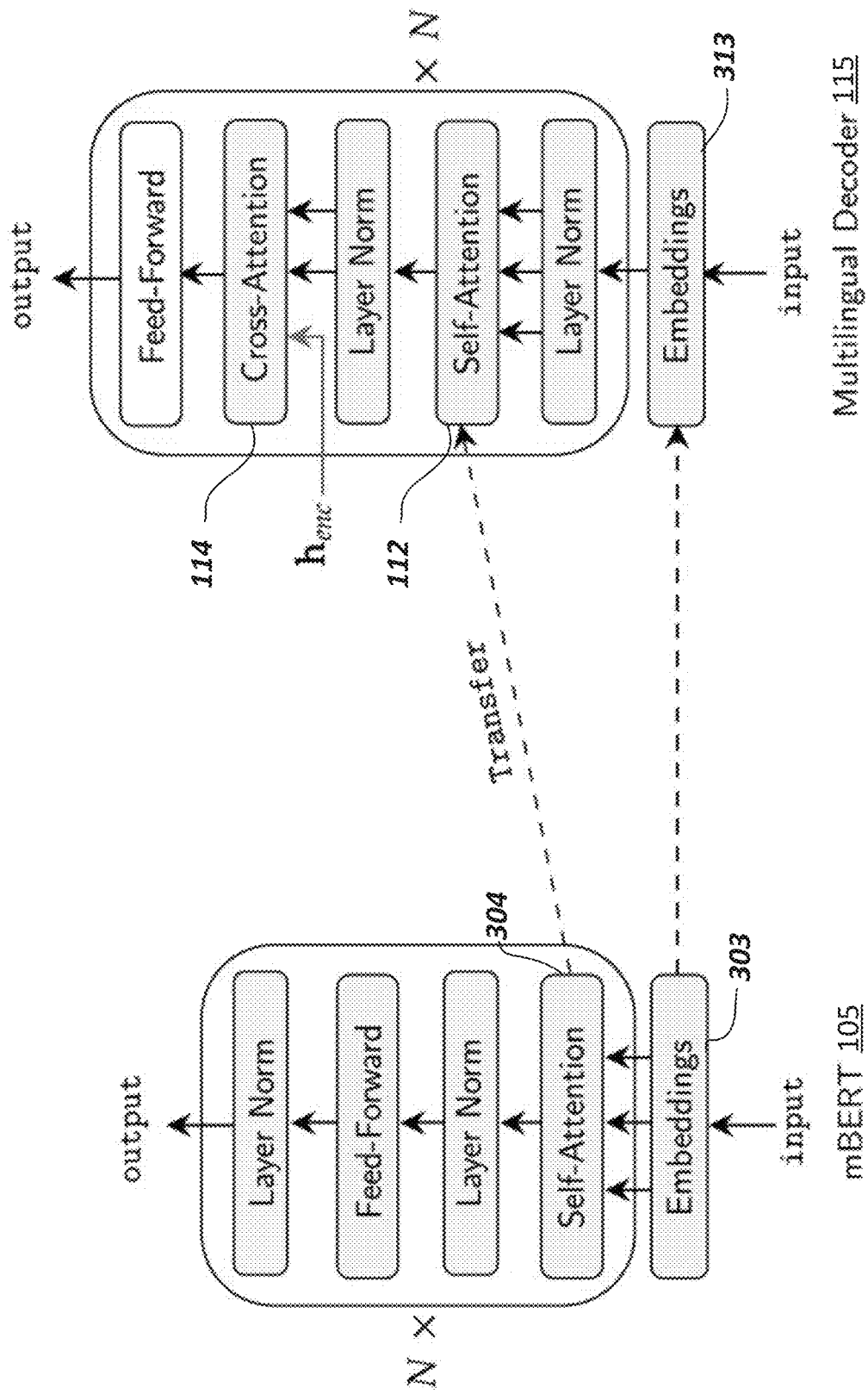
FIG. 3 is a simplified diagram illustrating parameter transfer from a pre-trained multilingual language model mBERT to a transformer decoder, according to embodiments described herein.

FIG. 3 is a simplified diagram illustrating parameter transfer from a pre-trained multilingual language model mBERT 105 to a speech recognition decoder 115, according to embodiments described herein. As shown in FIG. 3, mBERT 105 may be adapted as an autoregressive transformer decoder 115 in the following way: the embeddings from the mBERT embedding layer 303 and self-attention parameters from the self-attention layer 304 of mBERT are transferred into the embedding layer 313 and the self-attention layer 112 of the decoder layers of the decoder 115, respectively.

As mBERT 105 was originally trained on text data only, to explore both the acoustic and text space, a cross-attention layer 114 is added in the decoder 115 to apply to the encoder output for each mBERT layer in addition to the self-attention layer 112. In this way, the cross-attention layer 114 and self-attention layers 112 are learned to "align" the acoustic and text spaces for the speech recognition. This is because the text space may diverge significantly from the acoustic space of the encoder output.

Specifically, at current decoding step t, the autoregressive decoder 115 takes the current input token $y_t$ to predict the next token $y_{t+1}$. The embedding layer 313 (operated under embeddings from mBERT embedding layer 303) converts the input token to a vector representation. Subsequently, the cross-attention layer 114 takes the encoder output $h_{enc}$ as the key and value, and the self-attention output as the query, and computes the attention output.

It may be noted that the vocabulary size of the original mBERT may be too large (119,547 tokens) for training the end-to-end speech recognition system. Therefore, vocabulary mapping is performed to reduce the number of targets for the speech transformer. For example, sentence pieces (SP) are used as the target tokens. The SP models are trained on the transcriptions with a preset vocabulary size. As an example implementation, a shared set of 5,237 tokens as the multilingual system's vocabulary may be used. The minimum number in the token set for the sentence piece model is 150 for all the monolingual systems, except Chinese with 2,265 tokens. The generated sentence piece tokens are then matched against the mBERT token set. During training, the embeddings of all tokens in the mBERT vocabulary are initialized with mBERT embeddings.

Figure 4A:
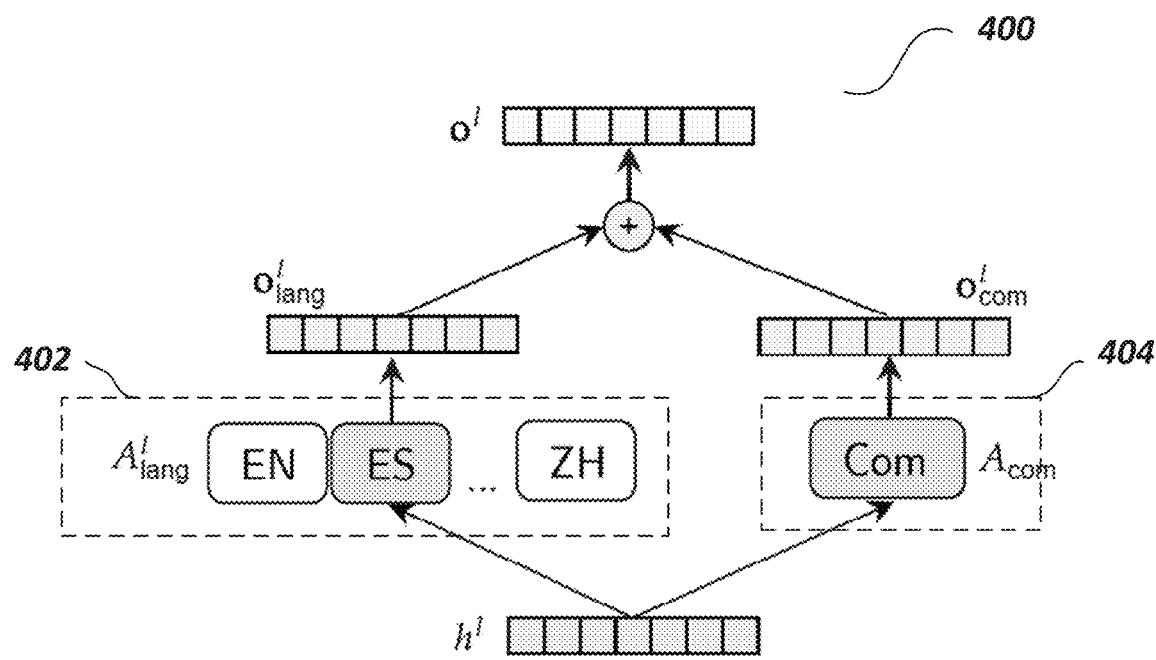
FIG. 4A shows an exemplary diagram illustrating the work flow within the language adapter and FIG. 4B shows the exemplary structure of the language adapter shown in FIGS. 1 and 2A-2B, according to embodiments described herein.
Figure 4B:
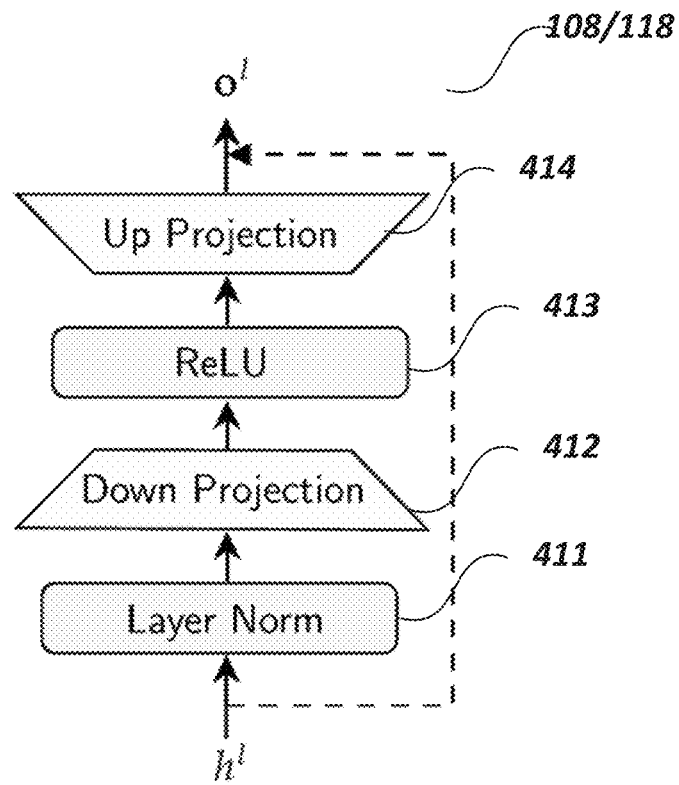

FIG. 4A shows an exemplary diagram 400 illustrating the work flow within the language adapter 108 or 118 and FIG. 4B shows the exemplary structure of the language adapter 108 or 118 shown in FIGS. 1 and 2A-2B, according to embodiments described herein. For example, the language adapter 108 or 118 may adopt a dual adapter structure: a lightweight residual language adapter 402 for better acoustic modelling with minimal language-specific parameters to increase the model robustness to languages with limited resources; and in addition to the language-specific adapter 402 for capturing the language-intrinsic knowledge, a shared common adapter 404 is also trained to learn language-agnostic information in the multilingual data. The language-specific and common adapters 402, 404 are denoted as $A_{lang}$ and $A_{com}$ respectively.

In one embodiment, the language-specific adapter is identified by a language mask. For example, as shown in FIG. 4A, the language-specific adapter 402 is specific to the Spanish language.

As shown in FIG. 4B, each adapter 108 or 118 of layer l includes a layer norm 411, down-projection layer 412 $W_d^l$, followed by a ReLU activation function 413, and an up-projection layer 414 $W_u^l$. Specifically, the language-specific and common adapters 402 and 404 receive $h^l$ as the input, where $h^l$ is the self-attention output (e.g., from self-attention layer 106 in encoder 110 or the self-attention layer 112 in decoder 115, depending on whether the language adapter resides in the encoder 110 or decoder 115) of layer l. The output of the adapter Adapter ($h^l$) may then be computed as following for both language-specific adapter 402 and the common adapter 404, with $W^l_d$, $W^l_u$ and ReLU parameters configured for the language specific adapter 402 and the common adapter 404, respectively:

$$\text{Adapter}(h^l) = W^l_u(\text{ReLU}(W^l_d(\text{LayerNorm}(h^l)))) + h^l$$

For example, Adapter ($h^l$) may be computed as the output $o^l_{lang}$ of the language-specific adapter 402, and the output $o^l_{com}$ of the common adapter 404, respectively. Afterwards, the final adapter output $o^l$ is computed by adding adapter outputs $o^l_{lang}$ and $o^l_{com}$ and $o^l$ as the input to the feed-forward layer 109 in the encoder 110, or feed-forward layer 119 in the decoder 115. During training and inference, the outputs of both language-specific and common adapters are combined.

Figure 5:
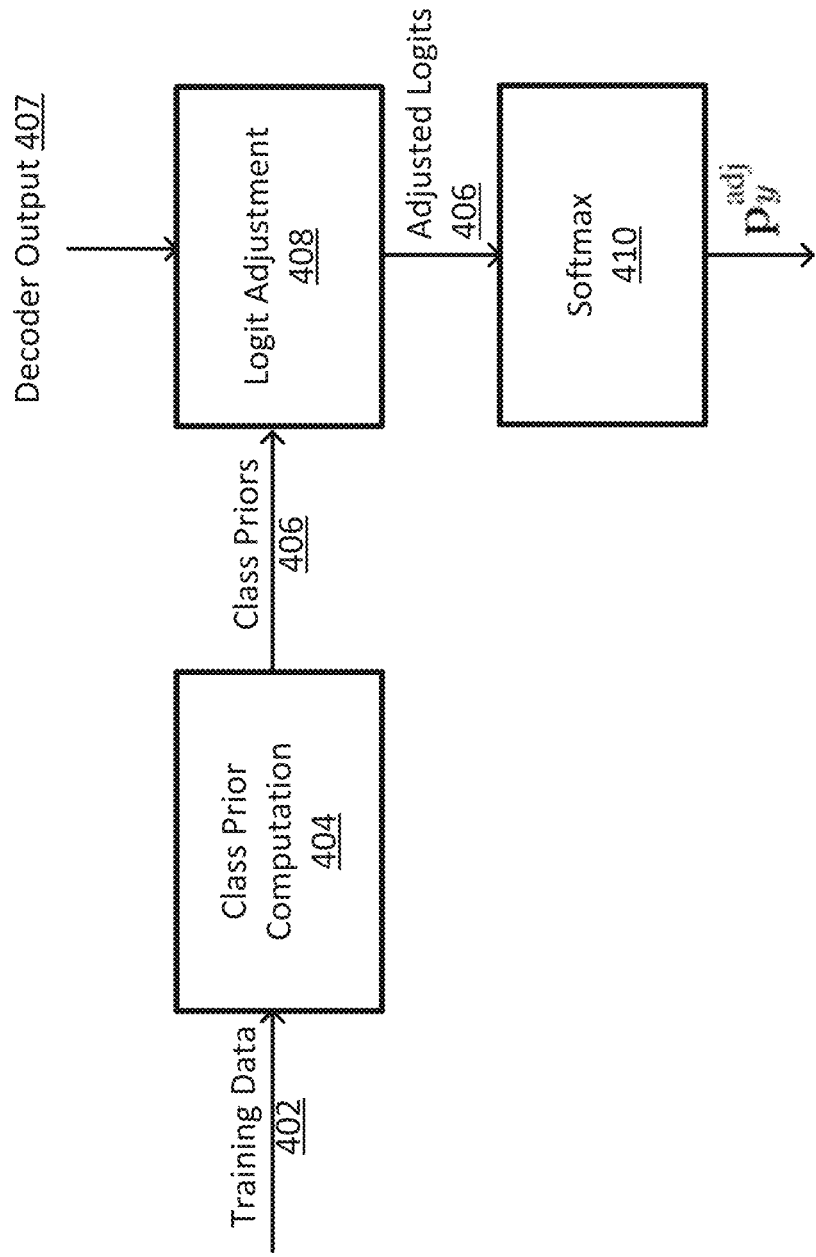
FIG. 5 provides an example diagram illustrating an example operation of the adjustment module shown in FIG. 1, according to embodiments described herein.

FIG. 5 provides an example diagram illustrating an example operation of the adjustment module 120 shown in FIG. 1, according to embodiments described herein. As previously described, due to the difference in availability of training data in different languages, the base model of encoder 110 and decoder 115 may be affected by a sentence piece class imbalance problem. The logit adjustment module 120 may address the imbalance issue by incorporating the class priors during training or inference via logit adjustments.

The adjustment module may adjust the decoder output 407 from decoder 115 in FIG. 1, e.g., $y_t = f(y_{t-1}, h_{enc})$ using computed class priors 406. For example, class priors $\pi_y$ are the natural frequencies of the sentence piece tokens estimated from the multilingual training data. To form a valid prior distribution, the class prior computation module 404 applies smoothing to the raw counts for zero occurrence tokens to compute the class priors:

$$\pi_y = \begin{cases} \dfrac{C_i}{C} - \dfrac{1}{(N-n_0) \times C}, & C_i > 0 \\ \dfrac{1}{n_0 \times C}, & \text{otherwise} \end{cases}$$

where C is the total number of counts for all labels, $n_0$ is the number of labels with zero occurrences, N is the number of classes and $c_i$ is the raw count of class i.

The class priors 406 is then output to the logit adjustment 408, which also receives decoder output 407. The logit adjustment 408 may output to a softmax classifier 410, with adjusted logits 406 as input that minimizes the balanced error across all classes. At logit adjustment 408, A natural adjustment is to scale the logits $f_y(x)$ by the inverse of the corresponding class prior $\pi_y$. In the log domain, the adjustment can be performed as follows:

$$f_y^{adj}(x) = f_y(x) - \tau \cdot \log \pi_y$$

where $\tau > 0$ is a hyper-parameter. The adjustment can be viewed as applying a class-dependent offset to re-weight each logit according to its class prior.

To incorporate the priors during training, the decoder output 407 includes logits $f_{y_t}^{dec}$ of the last decoder layer are adjusted before softmax 410 according to:

$$f_{y_t}^{dec} = w_y^T \cdot \text{Decoder}(h_{enc}, \text{Embedding}(y_t - 1)),$$

$$f_{y_t}^{adj} = f_{y_t}^{dec} - \tau \cdot \log \pi_{y_t},$$

$$p_{y_t}^{adj} = \frac{\exp(f_{y_t}^{adj})}{\sum_{y'_t \in [N]} \exp(f_{y'_t}^{adj})}.$$

The adjusted softmax output vector $p_y^{adj}$ of the sequence from the softmax classifier 410 is used as $p_{attn}$ to compute the loss objective as described in relation to FIG. 1, and perform the backward propagation to update the base model. $y_{t-1}$ is the previous label available only during training. To reduce the training and inference discrepancy, scheduled sampling may be used for sequential classification tasks like speech recognition. During later training iterations, instead of using the ground truth label $y_{t-1}$ for computing the logits, an approximated label $y'_{t-1}$ may be used instead which is chosen from the maximum prediction output of the current model to simulate the inference:

$$y_{t-1}' = \text{argmax}_y p_{y_{t-1}}^{adj}$$

In one embodiment, if the scheduled sampling is used, the adjusted logits 406 at step t will have influence over all of the following tokens in the current sequence. In some traditional label smoothing methods, the prior $\pi_y$ is usually a uniform distribution that is independent of the data. The logit adjustment 408 applies a class-specific "smoothing" based on the class prior, and has been shown to be superior to the baseline with the standard label smoothing.

Alternatively, the class priors 406 can be incorporated during inference via logit adjustments. The decoding score is computed as follows:

$$\hat{y} = \underset{y \in Y^*}{\text{argmax}} \{\beta p_{ctc}(y \mid h_{enc}) + (1 - \beta) p_y^{adj}\}$$

During beam search, the attention decoding scores $p_y^{adj}$ are computed in the same way as the scheduled sampling from the adjusted logits 406.

Computer Environment

Figure 6:
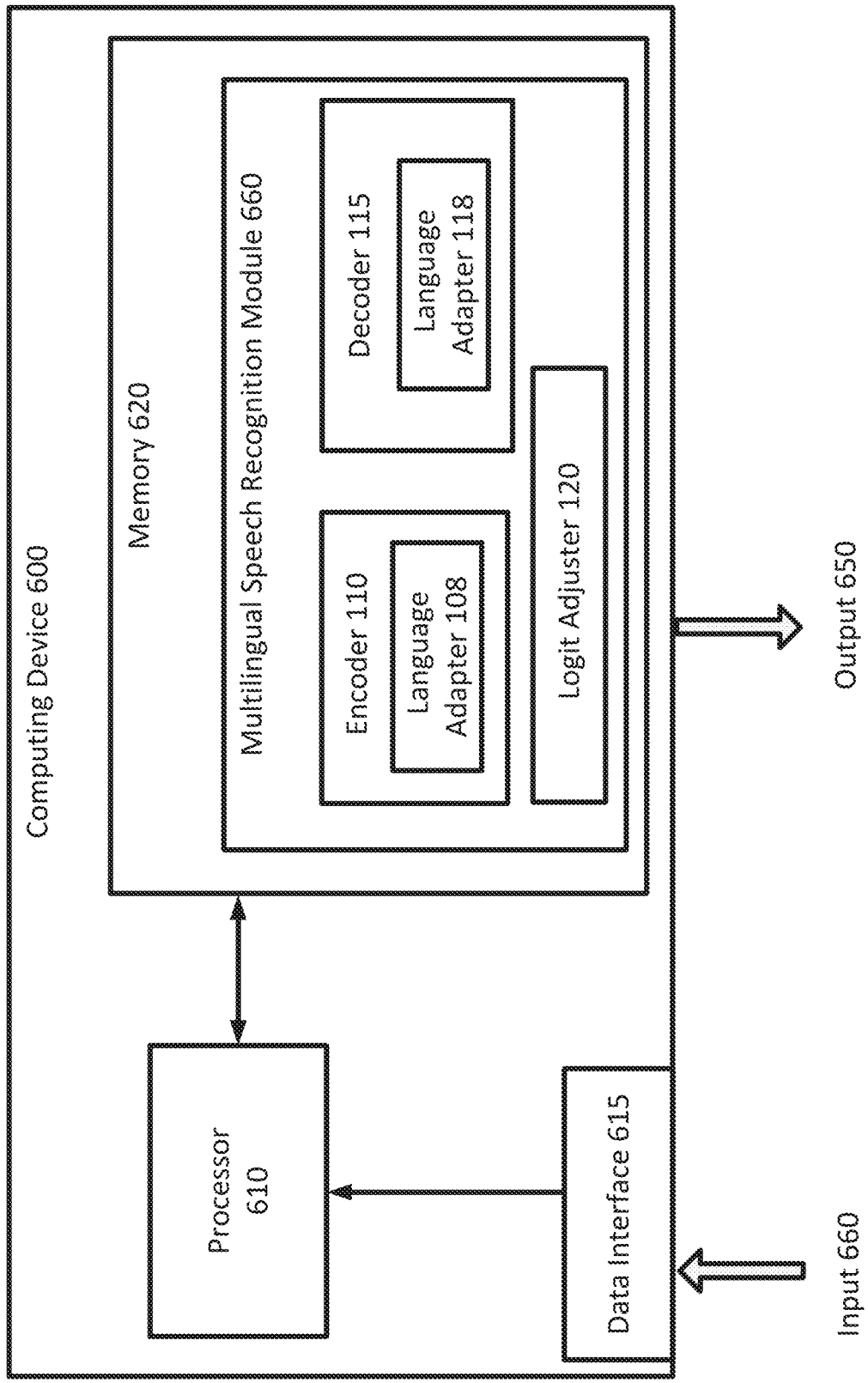
FIG. 6 is a simplified diagram of a computing device for implementing the end-to-end transformer framework for multilingual speech recognition, according to some embodiments.

FIG. 6 is a simplified diagram of a computing device for implementing the end-to-end transformer framework 600 for multilingual speech recognition, according to some embodiments. As shown in FIG. 6, computing device 600 includes a processor 610 coupled to memory 620. Operation of computing device 600 is controlled by processor 610. And although computing device 600 is shown with only one processor 610, it is understood that processor 610 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 600. Computing device 600 may be implemented as a stand-alone subsystem, as a board added to a computing device, and/or as a virtual machine.

Memory 620 may be used to store software executed by computing device 600 and/or one or more data structures used during operation of computing device 600. Memory 620 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 610 and/or memory 620 may be arranged in any suitable physical arrangement. In some embodiments, processor 610 and/or memory 620 may be implemented on a same board, in a same package (e.g., system-in-package), on a same chip (e.g., system-on-chip), and/or the like. In some embodiments, processor 610 and/or memory 620 may include distributed, virtualized, and/or containerized computing resources. Consistent with such embodiments, processor 610 and/or memory 620 may be located in one or more data centers and/or cloud computing facilities.

In some examples, memory 620 may include non-transitory, tangible, machine readable media that includes executable code that when run by one or more processors (e.g., processor 610) may cause the one or more processors to perform the methods described in further detail herein. For example, as shown, memory 620 includes instructions for a multilingual speech recognition module 660 that may be used to implement and/or emulate the systems and models, and/or to implement any of the methods described further herein. In some examples, the multilingual speech recognition module 660, may receive an input 640, e.g., such as audio speech samples in different languages, via a data interface 615. The data interface 615 may be any of a user interface that receives an articulated audio input, or a communication interface that may receive or retrieve a previously stored audio sample from the database. The multilingual speech recognition module 660 may generate an output 650 such as a transcript corresponding to the audio speech input 640.

In some embodiments, the multilingual speech recognition module 660 may implement the transformer-based model including the encoder 110 and decoder 115 shown in FIG. 1. Similar to what has been described in relation to FIG. 1, the encoder 110 and the decoder 115 each includes a language adapter 108 and 118, respectively. The multilingual speech recognition module 660 may further includes the logit adjuster 120 shown in FIG. 1.

In some examples, the multilingual speech recognition module 660 and the sub-modules 110, 115 and 120 may be implemented using hardware, software, and/or a combination of hardware and software.

Adapt-and-Adjust Work Flow

Figure 7B:
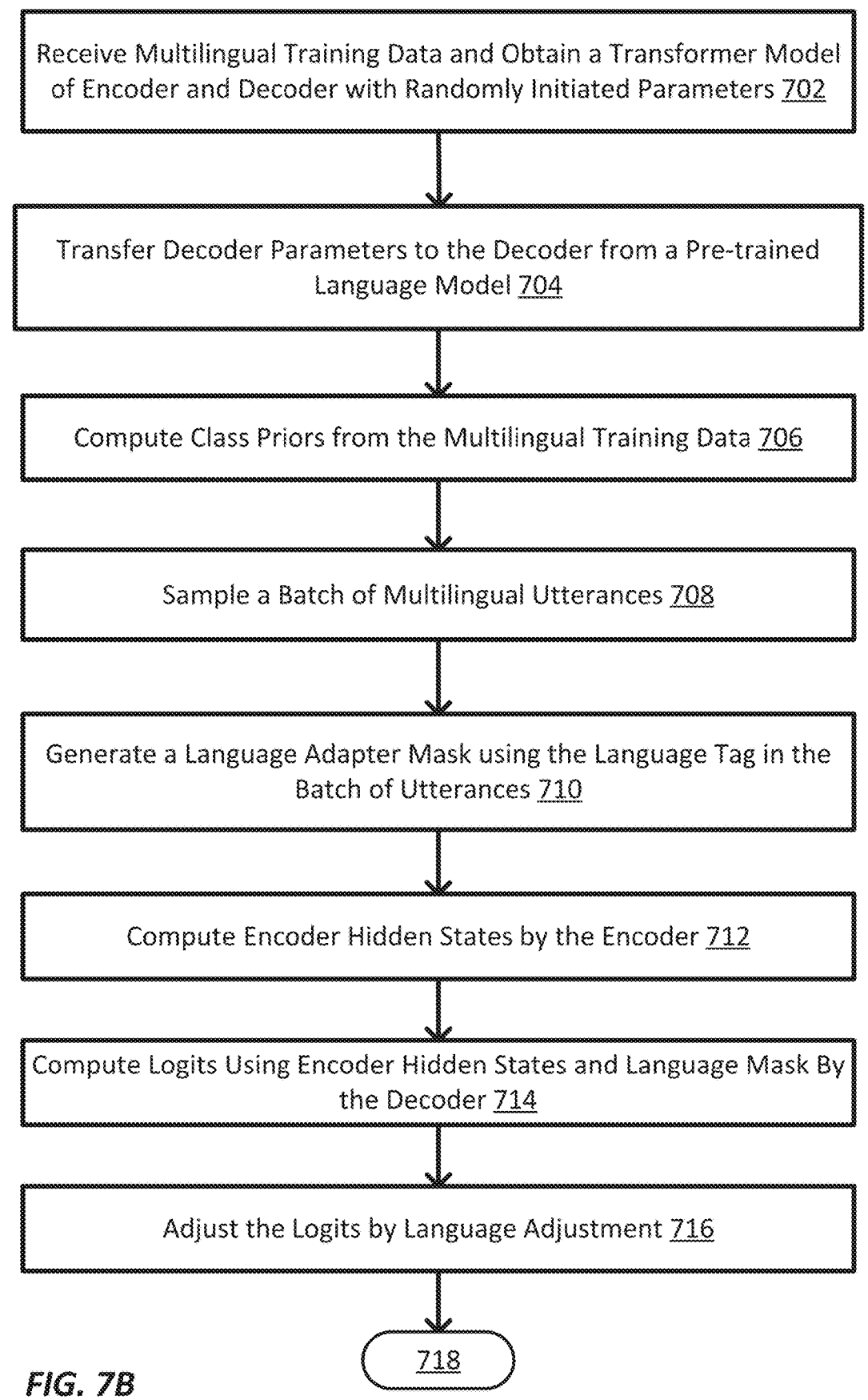
FIG. 7A provides an example pseudo-code segment illustrating a process flow implemented by the multilingual framework shown in FIG. 1, and FIGS. 7B-7C provide an example logic flow diagram corresponding to the example pseudo-code segment, according to embodiments described herein.
Figure 7C:
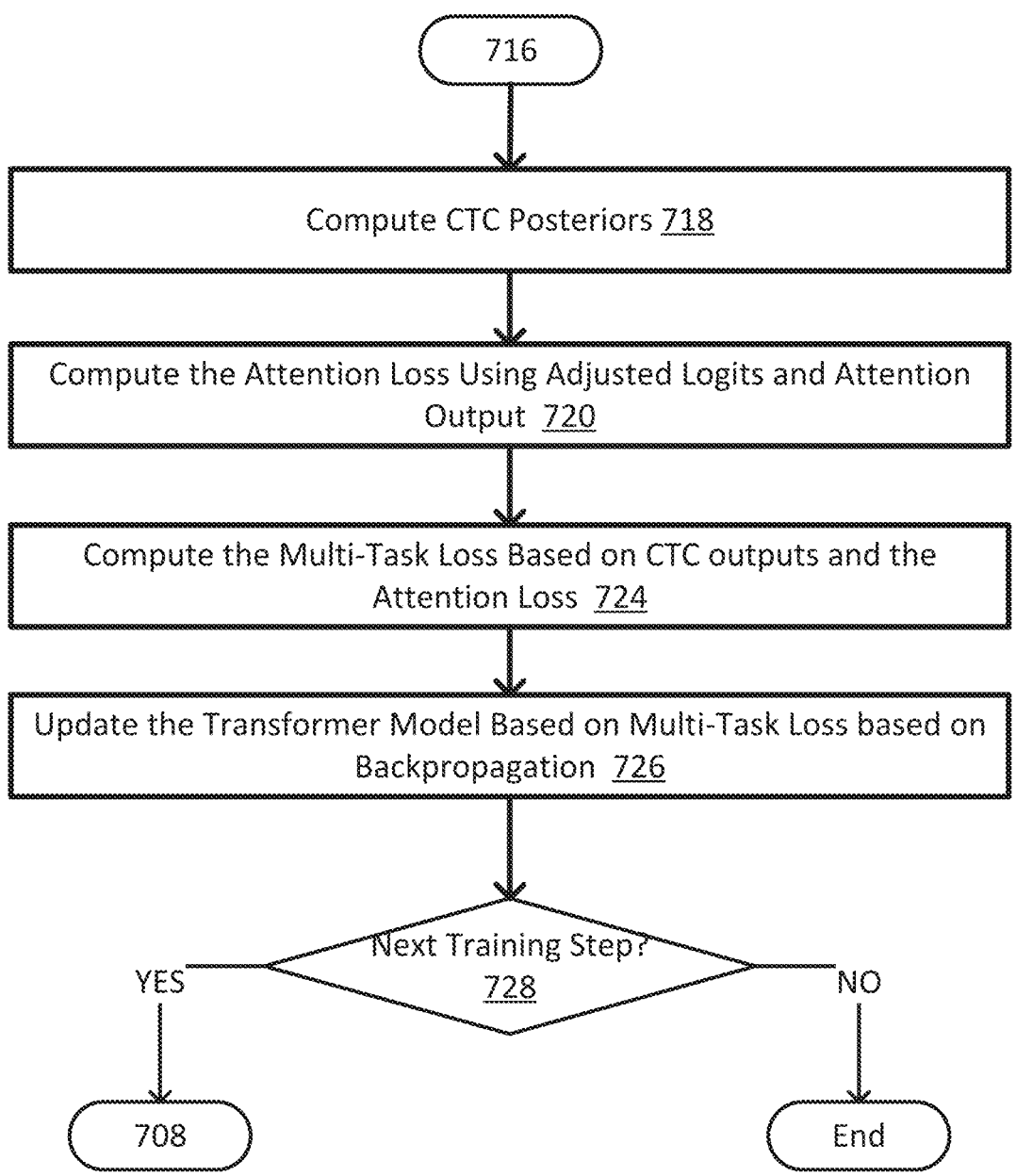

FIG. 7A provides an example pseudo-code segment illustrating a process flow implemented by the multilingual framework 100 shown in FIG. 1, and FIGS. 7B-7C provides an example logic flow diagram 700 corresponding to the example pseudo-code segment, according to embodiments described herein. One or more of the processes 702-728 of method 700 may be implemented, at least in part, in the form of executable code stored on non-transitory, tangible, machine-readable media that when run by one or more processors may cause the one or more processors to perform one or more of the processes 702-728. In some embodiments, method 700 may correspond to the method used by the module 660.

At step 702, a training dataset of multilingual data may be received, e.g., at the data interface 615, and a transformer model including the encoder 110 and decoder 115 may be initialized with randomly initiated parameters. For example, the transformer model may be stored at memory 620.

At step 704, decoder parameters may be transferred from a pre-trained language model (e.g., mBERT) to the transformer decoder, e.g., as described in relation to FIG. 3.

At step 706, class priors may be computed from the multilingual training data, e.g., as described at class prior module 404 in FIG. 4.

At step 708, a batch of multilingual utterances may be sampled from the training dataset.

At step 710, a language adapter mask may be generated using the language tag in the batch of utterances. For example, the language adapter mask may indicate the specific type of Language of the multilingual utterance, e.g., Spanish, English, etc.

At step 712, encoder hidden states, e.g., $h_{enc}$ may be computed by the encoder 110 based on the input utterance x and the language mask.

At step 714, logits may be computed based on the encoder hidden state and the language mask by the decoder 115.

At step 716, the computed logits may be adjusted by the language adjustment, e.g., as described in relation to FIG. 5.

At step 718, the encoder may generate CTC posteriors, e.g., $p_{CTC}(y|h_{enc})$ shown in FIG. 1.

At step 720, the attention loss may be computed based on the adjusted logits, and attention outputs.

At step 724, the multi-task loss may be computed based on the attention loss, CTC outputs and the interpolation parameter k.

At step 726, the transformer model, e.g., encoder 110 and decoder 115, may then be jointly updated based on the multi-task loss via backpropagation.

Steps 708-726 may be repeated until there is no more training step (at decision 728). Process 700 may end after decision 728 when there is no more training step, otherwise, steps 708-726 may be repeated from decision 728.

Example Performance

Multilingual training dataset may include the Common-Voice dataset (see Ardila et al., Common voice: A massively-multilingual speech corpus, in Proceedings of the 12th Language Resources and Evaluation Conference, pp. 4218-4222, 2020). 11 languages are used: English (en), Spanish (es), French (fr), Italian (it), Kyrgyz (ky), Dutch (nl), Russian (ru), Swedish (sv), Turkish (tr), Tatar (tt), and Chinese (zh). The dataset is split into training, dev, and eval sets according to the ESPNET recipe. The transcriptions are tokenized using the SentencePiece model with the unigram algorithm. The SentencePiece model is trained using speech transcriptions. Special tokens, such as <unk>, <sos>, <eos>, and a blank token are added for the CTC objective.

Six transformer encoder layers with a hidden size of 2048 units and eight attention heads are used, each with an attention dimension of 256. For the decoder, distil-mBERT (see Sanh et al., Distilbert, a distilled version of BERT: smaller, faster, cheaper and lighter, arXiv preprint arXiv: 1910.01108, 2019) is used. The mBERT decoder consists of six transformer decoder layers with a hidden size of 3072 and an attention dimension of 756, and four attention heads. The model is trained with a batch size of 32 and accumulate the gradient in two steps to have a larger batch size using a single GPU NVIDIA V100 16 GB. The models are trained with the Adam optimizer with a warm-up step of 25000. In particular, for balanced sampling, six samples are taken for each language and construct a balanced batch by accumulating the gradient 11 times.

The model may be implemented using beam-search with a beamwidth of 10 and $\lambda=0.3$ and $\beta=0.5$. The hyper-parameter T is set to 0.3 for both the training and inference phase class imbalance adjustments. The multilingual models are trained with 150K iterations. The average over the last ten checkpoints is computed as the decoding model. For the monolingual setting, the training stops after 100 epochs of training. Models are evaluated using the character error rate (CER) to simplify the evaluation and to have a universal metric for all languages.

For baseline comparison, baseline models include: Monolingual (monolingual models); SMT (Standard Multilingual Training) which randomly samples the batch from the data distribution; BS (Balanced Sampling) which samples the same number of utterances for each language in a batch so that they have roughly equal contributions to the training; LAN-Specific Adapters including language-specific adapters proposed by Kannan et al., Large-scale multilingual speech recognition with a streaming end-to-end model. Proc. Interspeech 2019, pp. 2130-2134, 2019); and LID: (language ID) conditioning with one-hot language vectors proposed by Li et al., Multi-dialect speech recognition with a single sequence-to-sequence model, in 2018 IEEE international conference on acoustics, speech and signal processing (ICASSP), pp. 4749-4753, 2018.

FIG. 8 provides a table of example test results in terms of CER on the training dataset, according to one embodiment described herein. As shown in Table 1 in FIG. 8, compared to the monolingual models, even the SMT models improve the performance of the low-resource languages significantly. In other words, SMT is a decent multilingual baseline to be compared with. This may be because the multilingual models can capture common sub-phonetic articulatory features that are shared by different languages and are beneficial for low-resource languages recognition.

In addition, compared to the SMT, the tail language performance is significantly boosted. However, the performance of the head languages suffers due to fewer occurrences during training. The model is clearly overfitted to the tail languages due to up-sampling, for example, the CERs on the training set of "ky" and "sv" are significantly lower than the evaluation data (3.4% and 4.2% training vs 13.4% and 22.8% evaluation). Consequently, the overall performance is the same as SMT. In fact, even after balanced sampling, the sentence piece tokens still have a long-tailed distribution.

The language adaptation techniques are compared with the LAN-Specific Adapters, the one-hot language vector and the Dual-Adapters. Note that all adapters are based on BS+mBERT, which has better performance than the BS-only model. Adding the language-specific adapters without common adapters significantly outperforms the BS baseline, with a 0.9% absolute performance gain. Another way of injecting language in-formation is to augment a one-hot language vector. Interestingly, applying sentence piece class imbalance adjustment (LID+Adjust-Train) to the language vector significantly improves the CER.

Both the training and inference phase adjustments provide a significant performance gain over the LAN-Specific Adapters, with 1% absolute CER reduction. The gains are mostly due to the improved performance of the head languages, although tail languages also benefit from the logit adjustments. More importantly, the gap between the monolingual and multilingual performance for the head languages is greatly reduced, leading to a better "balanced error" performance. This strongly justifies the importance of class imbalance adjustments. Compared to BS, A2 also avoids overfitting to the tail languages, CERs on "ky" and "sv" are 8.2% and 23.6%, much closer to evaluation CERs. Compared to SMT with random sampling, A2 has a significantly better averaged CER with a modest cost for the two head languages "fr" and "en".

FIG. 9 provides a table of ablation study results on mBERT illustrating the effectiveness of mBERT, according to one embodiment described herein. The performance of mBERT depends heavily on the quality of the acoustic models. Without adapters or logit adjustments, the improvement over BS is marginal, and mBERT performance is even worse for SMT. This may indicate that, with better acoustic models like A2, the text space of the vanilla mBERT is better aligned with the acoustic space, which leads to improved performance across all languages, especially for low-resource ones. It is also interesting to note that, even without adapters, "SMT+mBERT+Adjust-Train" yields the same overall CER as the best adapter system (BS+mBERT+Dual-Adapters).

In some implementations, to study the impacts of the pretrained language models, a more advanced XLM-R pretrained model is used in place of the distilled-mBERT. Although XLM-R has a better multilingual language generation capability than mBERT, it does not translate to the final performance gain for the multilingual ASR task.

FIG. 10 provides a table of example ablation study results on language adapters, according to one embodiment described herein. The results and parameter sizes of different adapters are given in Table 3 of FIG. 10. For example, decoder layer adapters may be less effective as in the encoder layers, indicating adaptation of the acoustic space is much more effective than of the text space. Therefore, decoder adapters (e.g., 118) may be optional.

FIG. 11 provides a table of example ablation study results of language adapters showing the effectiveness of the common language adapters, according to one embodiment described herein. The Dual-Adapters outperform the language-specific adapters significantly, by a 0.5% absolute CER reduction, indicating knowledge transfer with the common adapter is effective.

In addition to the individual language adapters, languages are divided into groups to allow sharing of adapters within the same group. According to the written scripts, the 11 languages may be divided into language groups, e.g., Latin, Chinese characters and Cyrillic scripts. They can also be grouped into language families, e.g., Romance, Chinese, Turkic, Germanic. This group focuses more on the similarities in lexica, grammars, and pronunciations, which are usually subsumed under the end-to-end multilingual architectures. According to one group, languages that belong to the same cluster do not necessarily belong to the same cluster in the other group. For example, Tartar and Turkish are both Turkic languages. However, Tartar uses the Cyrillic script, and Turkish uses the Latin alphabet. All languages in the same group share the same dual-adapters, and the adapters are trained with all language members. In general, grouping by language families is better than grouping by written scripts because it is more consistent with the encoder adapters for adapting the acoustic space, which are more effective than decoder adapters in Table 3.

Compared to individual language adapters, sharing language adapters by language families helps the low-resource languages performance, e.g., "sv" of the Germanic group, "ky" and "tr" of the Turkic group because more data are used to train the group adapters. However, this also comes with a cost to the resource-rich languages compared to "Individual Dual-Adapters". Therefore, individual language adapters are advised considering the adapters' parameter sizes are much smaller than the encoder and decoder attention weights.

FIG. 12 provides a table of example performance illustrating training and inference phase logit adjustments with different models, according to one embodiment described herein. As shown by Table 5 of FIG. 12, for the SMT systems, training phase adjustment shows a clear advantage over inference phase adjustment. Under the convex assumption, the solution of the two adjustment approaches is the same. However, deep neural network optimization is a non-convex problem, so they may converge to different local minima. Under SMT, the model is heavily biased towards the head classes due to random sampling. Training phase class imbalance adjustment can help the training to place more focus on the tail classes, leading to much better balanced and lower error. With better acoustic models, e.g., language adapters, the inference phase adjustment can better calibrate the raw classification scores and yield similar performance to the training phase adjustment.

Some examples of computing devices, such as computing device 100 may include non-transitory, tangible, machine readable media that include executable code that when run by one or more processors (e.g., processor 110) may cause the one or more processors to perform the processes of method 600. Some common forms of machine readable media that may include the processes of method 600 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A system for multilingual speech recognition, the system comprising:
   a communication interface that receives an audio input of a multilingual utterance;
   a memory storing an encoder comprising a plurality of neural network based encoder layers and a decoder comprising neural network based decoder layers, and a plurality of processor-executable instructions; and
   a processor executing the instructions to perform operations of the encoder and the decoder, wherein the operations comprise:
      attending, via a first self-attention layer of the encoder, features of the input of the multilingual utterance into a first self-attention output;
      adapting, by a first language-specific adapter of the encoder, the first self-attention output into a first adapter output capturing language-intrinsic knowledge from self-attended features,
      adapting, by a first common adapter of the encoder, the first self-attention output into a second adapter output capturing language-agnostic knowledge from the self-attended features, and
      generating, by a first feed-forward sublayer of the encoder, an encoded representation of the input based on a combination of the first adapter output and the second adapter output;
      generating, by the decoder, a logit output of a current token based on encoder hidden states corresponding to the encoded representation of the input from the encoder and a previous token; and
      generating an output transcript corresponding to the audio input of the multilingual utterance based on adjusting the logit output.

2. The system of claim 1, wherein the decoder comprising a plurality of decoder layers, wherein a decoder layer from the plurality of decoder layers comprises:
   a second self-attention layer that attends to embeddings corresponding to the previous token;
   a cross-attention layer that attends to the encoder hidden states and a second self-attention output from the second self-attention layer;
   a second language-specific adapter and a second common adapter that adapt a cross-attention output within the decoder layer, and
   a second feed-forward sublayer that generates the logit output based on a combination of outputs from the second language-specific adapter and the second common adapter.

3. The system of claim 2, wherein the decoder is an autoregressive transformer decoder, and
   wherein the embeddings and parameters of the second self-attention layer are copied from counterparts in a pre-trained language model.

4. The system of claim 2, wherein the cross-attention layer takes the encoder hidden states as a key and a value, and takes the second self-attention output as a query to compute the cross-attention output.

5. The system of claim 1, wherein each of the first language-specific adapter and the common adapter includes a down-projection layer, a ReLU activation module, and an up-projection layer.

6. The system of claim 1, wherein the first language-specific adapter is specified by a language mask, and
wherein the first adapter output is generated based at least in part on the language mask.

7. The system of claim 1, wherein the operations further comprising:
adjusting, by a language adjustment module, the logic output from the decoder by applying a class-dependent offset to each logit according to a corresponding class prior.

8. The system of claim 7, wherein the class prior is computed by frequencies of sentence piece tokens estimated from a multilingual training dataset.

9. The system of claim 7, wherein the adjusted logit output is used to compute a predicted probability distribution of the current token.

10. The system of claim 1, wherein the encoder and the decoder are jointly trained by a loss objective computed based on the adjusted logit output, a label distribution and a connectionist temporal classification output from the encoder.

11. A method for multilingual speech recognition, the method comprising:
receiving, via a communication interface, an audio input of a multilingual utterance;
encoding, by an encoder that is implemented via a neural network running on a processor, the audio input of the multilingual utterance into an encoded representation by:
attending, by a first self-attention module, to features of the multilingual utterance;
adapting, by a first language-specific adapter, a first self-attention output into a first adapter output capturing language-intrinsic knowledge from self-attended features,
adapting, by a first common adapter, the first self-attention output into a second adapter output capturing language-agnostic knowledge from the self-attended features, and
generating, by a first feed-forward sublayer, the encoded representation of the audio input of the multilingual utterance based on a combination of the first adapter output and the second adapter output;
computing, by a decoder that is implemented via the neural network running on the processor, a logit output of a current token based on encoder hidden states from the encoder and a previous token; and
generating an output transcript corresponding to the audio input of the multilingual utterance based on adjusting the logit output.

12. The method of claim 11, further comprising:
generating a language adapter mask based on a language tag in the multilingual utterance, wherein the first language-specific adapter is specified by the language mask.

13. The method of claim 11, wherein the decoder is an autoregressive transformer decoder, and the method further comprises:
copying embeddings and self-attention parameters from a pre-trained language model to an embedding layer and the second self-attention layer of the decoder.

14. The method of claim 11, further comprising:
attending, by a second self-attention layer, to embeddings corresponding to the previous token;
attending, by a cross-attention layer, to the encoder hidden states and a second self-attention output from the second self-attention layer;
adapting a cross-attention output by a second language-specific adapter and a second common adapter within the decoder; and
generating the logit output based on a combination of outputs from the second language-specific adapter and the second common adapter.

15. The method of claim 14, further comprising:
taking, by the cross-attention layer, the encoder hidden states as a key and a value, and the second self-attention output as a query to compute the cross-attention output.

16. The method of claim 11, wherein each of the first language-specific adapter and the common adapter includes a down-projection layer, a ReLU activation module, and an up-projection layer.

17. The method of claim 11, further comprising:
adjusting the logic output from the decoder by applying a class-dependent offset to each logit according to a corresponding class prior,
wherein the class prior is computed by frequencies of sentence piece tokens estimated from a multilingual training dataset.

18. The method of claim 17, further comprising:
computing a connectionist temporal classification output from the encoder based on the encoder hidden states;
computing an attention loss based on a decoder output probability distribution computed from the adjusted logic output; and
computing a multi-task loss based on the connectionist temporal classification output and the attention loss.

19. The method of claim 18, further comprising:
jointly training the encoder and the decoder based on the multi-task loss via backpropagation.

20. A non-transitory processor-readable storage medium storing processor-executable instructions for multilingual speech recognition, the instructions being executed by a processor to perform:
receiving, via a communication interface, an audio input of a multilingual utterance;
encoding, by an encoder that is implemented via a neural network running on a processor, the audio input of the multilingual utterance into an encoded representation by:
attending, by a first self-attention module, to features of the multilingual utterance;
adapting, by a first language-specific adapter, a first self-attention output into a first adapter output capturing language-intrinsic knowledge from self-attended features,
adapting, by a first common adapter, the first self-attention output into a second adapter output capturing language-agnostic knowledge from the self-attended features, and
generating, by a first feed-forward sublayer, the encoded representation of the audio input of the multilingual utterance based on a combination of the first adapter output and the second adapter output;
computing, by a decoder that is implemented via the neural network running on the processor, a logit output of a current token based on encoder hidden states from the encoder and a previous token; and
generating an output transcript corresponding to the audio input of the multilingual utterance based on adjusting the logit output.

* * * * *